3,368,493
GUIDE VANE ARRANGEMENT
Masayoshi Terajima, Hitachi-shi, Japan, assignor to Hitachi, Ltd., Tokyo, Japan, a corporation of Japan
Filed Dec. 8, 1965, Ser. No. 512,490
Claims priority, application Japan, Jan. 25, 1965, 40/3,612, 40/3,613
3 Claims. (Cl. 103—97)

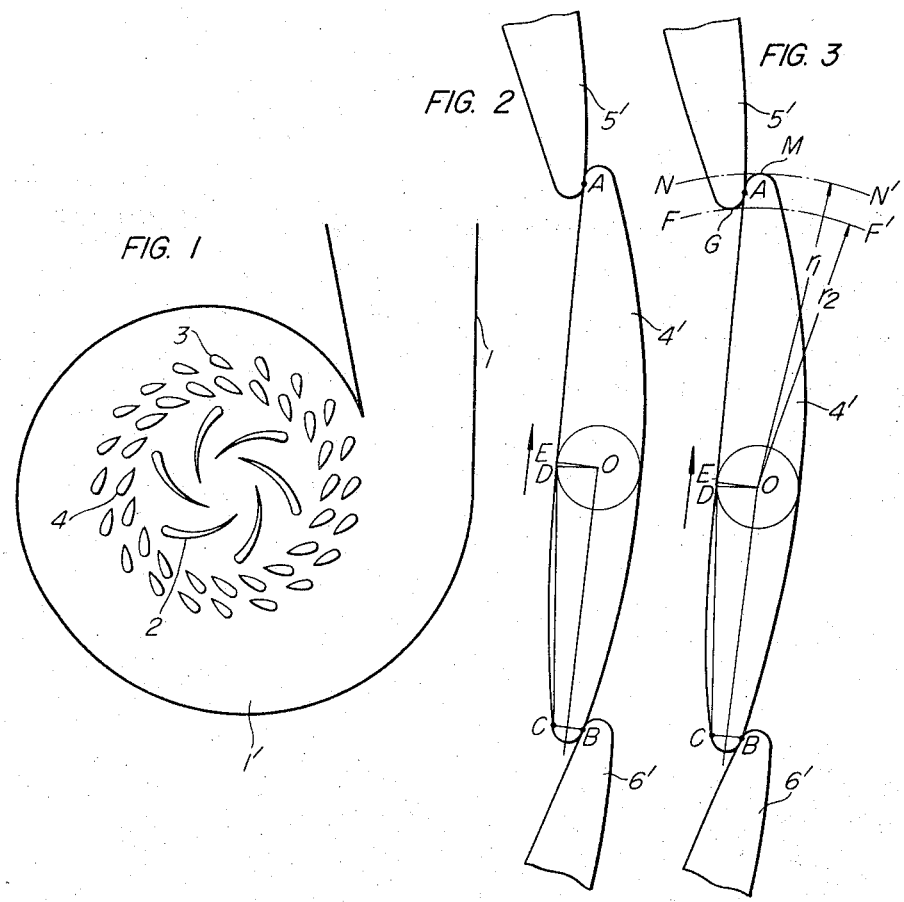

ABSTRACT OF THE DISCLOSURE

A radial flow turbo machine, particularly a Francis pump-turbine, wherein the guide vanes are pivotally mounted about axes arranged parallel to each other and in a circular row for movement between a closed position and an open position. The ratio of the line CD to the line AE being within the range between 0.86 and 1.0, and the ratio of the radiuses $r_1$-$r_2$ to the line AE falling within the range between 0.15 and 0.05.

Background of the invention and description

During the power generating operation of a pump turbine in a pumping-up power plant, water from a high-level water reservoir flows down through a penstock into the casing of the turbine, is straightened in its flow by stationary vanes secured to the casing, and is then passed through a guide vane group to impart its driving energy to runner vanes to cause rotation of the turbine runner.

In this type of power plant, a power generating unit consisting of a turbine runner and an electric generator is installed independently of a pumping unit consisting of a pump and an electric motor, or a pump, a water turbine and an electric generator are mounted on a common main shaft, or a single hydraulic unit is designed to serve for a dual purpose of power generation and pumping so that surplus power can be utilized to pump up and store water in the water reservoir at high level. In the pumping operation, the runner is driven by the electric motor so that water around the runner is centrifugally forced outwardly through the guide vanes and stationary vanes to be pumped up by way of the penstock into the water reservoir at high level. At the beginning of the pumping operation by the pump turbine, however, a strong vibration is frequently developed.

There are two methods for starting the pumping operation, that is, the starting method by controlling the inlet valve and the starting method by controlling the guide vanes. In the former method, the guide vanes are kept open at an opening of 10 to 20% or more of the full opening and the inlet valve is suitably opened or closed to pump up or stop pumping of water, while in the later method, the inlet valve is kept at its fully opened position and the guide vanes are opened or closed to pump up or stop pumping of water.

A trouble often encountered in this latter type of starting method is generation of hydraulic self-excited vibration of gradually or abruptly increasing amplitude when the guide vanes are at an extremely small opening. This is considered to be attributable to the following phenomenon. Or more precisely, presence of any pressure difference across the guide vane imparts torque to the guide vane and this torque acts to develop play and distortion in the guide vane driving part to thereby cause relative displacement of the guide vane. This relative displacement of the guide vane causes a variation in the condition of water flow, and periodic water hammering developed on the penstock side acts to periodically jolt the guide vane. The water hammering and the guide vane displacement interfere with each other to cooperatively generate the above-described hydraulic self-excited vibration of gradually or abruptly increasing amplitude.

This hydraulic self-excited vibration is entirely different from water hammering in its nature. Water hammering is a sort of damped vibration which is encountered during closing of a valve or stopping of a pump, and therefore its amplitude of vibration becomes gradually smaller until finally the vibration completely disappears. However, amplitude of hydraulic self-excited vibration becomes gradually larger or the vibration persists at constant amplitude. In this phenomenon, the potential energy of water is converted into the energy of vibration and counterbalances the energy lost by vibration. This hydraulic self-excited vibration is also seen during the water turbine operation for power generation but is not so violent as that encountered in the pump starting.

It is the primary object of the present invention to provide an improved guide vane arrangement by which hydraulic self-excited vibration priorly experienced with a pump turbine and pump can substantially be eliminated and the amplitude of such vibration can be minimized even if it occurs.

The above and other objects, advantages and features of the present invention will become apparent from the following description with reference to the accompanying drawings, in which:

FIG. 1 is a diagrammatic view showing the disposition of stationary vanes, guide vanes and runner vanes of a reversible pump turbine; and FIGS. 2 and 3 are enlarged sectional views of a guide vane arrangement according to the present invention in which guide vanes are shown in their closed position.

Referring to FIG. 1, water flowing downwardly through a penstock 1 during the water turbine operation is first guided into a casing 1' and passes through stationary vanes 3 fixed in the casing 1' to be straightened in its flow. This straightened flow of water then passes through guide vanes 4 to impart the driving energy to runner vanes 2 to cause the rotation of the same. During the pumping operation, the runner is rotated by the electric motor in a direction opposite to the direction of rotation during the water turbine operation to pump up water.

The present invention proposes an improved guide vane arrangement in which adjacent guide vanes are suitably disposed relative to each other so that substantially zero torque is imparted to each guide vane at a position at which the guide vane is nearly closed.

The following description discloses the finding of the inventors after an extensive study to seek the cause of hydraulic self-excited vibration.

In FIG. 2, guide vanes arranged according to the present invention are shown in their closed position. Or more precisely, one guide vane 4' of the guide vane group is contacted at its head and tail portions by adjacent guide vanes 5' and 6', respectively, so that there is no flow of water across the guide vane 4'.

Now consider the force of water which will be imparted to the guide vane 4' when it is at the completely closed position. In FIG. 2, the left-hand side or lower face of the guide vane 4' opposes the runner while the right-hand side or upperface thereof opposes the casing, and water flow circulates in a direction of arrow. Suppose now the head portion of the guide vane 4' contacts the adjacent guide vane 5' at a point A and the tail portion thereof contacts the adjacent guide vane 6' at a point B. A point C may be sought on the contour of the guide vane 4' in a manner that a perpendicular bisector of line BC passes through the pivoted center O of the guide vane 4'. Also, points D and E are determined so that $\angle ODC$ and $\angle OEA$ make right angles, respectively.

During the pumping operation, pressure on the pump side is higher than that on the casing side, and the torque which tends ot cause clockwise rotation of the guide vane 4' is caused by a force imparted to an arc AE and this torque is equal to a torque caused by a force imparted to a line AE. The torque which tends to cause counter-clockwise rotation of the guide vane 4' is caused by a force imparted to an arc BCD and this torque is equal to a torque caused by a force imparted to an arc CD, hence a line CD, since that portion of the torque caused by that portion of the force imparted to an arc BC becomes zero. The torque that may be imparted to an arc ED is negligible as a matter of fact. Therefore, any torque which tends to cause rotation of the guide vane 4' in either direction will not be developed at the completely closed state of the guide vane if the length of line CD is substantially equal to the length of line AE. Accordingly, a torque which tends to urge the guide vane 4' to its open position would be imparted thereto if the ratio CD/AE is smaller than 1.0 and a torque which tends to urge the guide vane 4' to its closed position would be imparted thereto if the ratio CD/AE is larger than 1.0. In fact, the value of the ratio CD/AE has a great influence on generation of hydraulic self-excited vibration.

In a crack-open state of the guide vane 4', water flows through the spaces between the vane 4' and adjacent vanes and this water flow provides a torque which tends to cause counterclockwise rotation of the guide vane 4'. This torque is variable depending on the condition of water flow passing between the guide vanes, and the water flow is variable depending on the shape of the guide vane. It is accordingly preferable that the value of the ratio CD/AE is made slightly smaller than 1.0, and a satisfactory result can be obtained by setting this ratio somewhere between 0.86 and 1.0. In the prior art, this ratio has been made more than 1.15 or, in guide vanes, of self-closing type, has been made less than 0.85.

In addition to the above-described hydraulic self-excited vibration, there is another type of vibration which is generated by the movement of the guide vane relative to water flow. This vibration is analogous to fluttering and, a qualitative analysis therefor has been disclosed that this kind of vibration is liable to develop when the guide vanes overlap each other in a greater degree and when the guide vanes are opened in a smaller degree. The inventor has found out that amplitude of this type of vibration can be made smaller by minimizing the overlap of the guide vanes relative to each other and by relatively quickly opening and closing the guide vanes so that the guide vanes may not remain in their crack-open position for a substantial time. These guide vanes can be opened and closed by hydraulic servo motors in accordance with conventional practice.

In FIG. 3, a point A is sought on the contour of the guide vane 4' as in the case of FIG. 2 and an arc NN' of radius $r_1$ is drawn about the pivotal center O of the guide vane 4' in a manner to be tangent to the apex M of the head portion of the guide vane 4'. Likewise, an arc FF' of radius $r_2$ is drawn about the pivotal center O of the guide vane 4' in a manner to be tangent to the tail portion of the guide vane 5' at a point G. With the arrangement, it is preferable that the ratio $(r_1-r_2)/AE$ is kept at a small value because self-excited vibration analogous to fluttering caused by water flow is liable to develop at a large value of the ratio $(r_1-r_2)/AE$. A satisfactory result can be obtained by setting this value with a range of 0.15 and 0.05. Any value less than 0.05 is unpractical due to extreme difficulty encountered in the design and manufacture of guide vanes and this lower limit 0.05 is the minimum value from the practical point of view. In the conventional practice, this value has generally been more than 0.18.

From the foregoing description, it will be understood that the guide vane arrangement according to the present invention can effectively prevent occurrence of hydraulic self-excited vibration and minimize the amplitude of such vibration even if this type of vibration occurs. The invention is advantageously applicable to a reversible pump turbine in a pumping-up power plant in which surplus power is utilized to drive an electric motor to drive in turn the pump turbine so that water around the runner can be centrifugally forced through guide vanes and stationary vanes and then upwardly through a penstock into a water reservoir at high level. When used with such turbine, generation of strong vibration during the starting of the pump turbine by means of opening control of the guide vanes can effectively be avoided and any danger involved in the starting of the pumping operation can thereby be eliminated.

Although a preferred embodiment of the present invention has been described with reference to the drawings, it will easily be understood that various changes and modifications may be made without departing from the spirit and scope of the invention.

What is claimed is:

1. A radial flow turbo machine operable as a reversible pump-turbine, comprising: a plurality of guide vanes pivotally mounted about a runner on generally parallel axes O arranged in a generally closed path for movement between a mutually serially engaging closed position and an open position out of contact with each other; each of said guide vanes having a head portion and a tail portion joining a radially outer face and a radially inner face with respect to said closed path; each of said guide vanes having a point A, a point on its radially inner face adjacent its head portion in contact with the radially outer face of the tail portion of an adjacent second guide vane in said closed path in the closed position; each of said guide vanes having a point B, a point on its radially outer face adjacent its tail portion in contact with the point A of an adjacent guide vane in said closed position; each of said guide vanes having a point C on its radially inner surface such that a perpendicular bisector of a line between the points B and C passes through its pivotal center O; each of said guide vanes having a point D on its inner face such that the angle ODC is 90°; each of said guide vanes having a point E on its inner face such that the angle OEA is 90°; each of said guide vanes having a radius $r_1$ from the pivotal center O to the arc tangent to its head portion and radius $r_2$ from its pivotal center O to the arc tangent to the tail portion of the guide vane immediately adjacent to its head portion; each of said guide vanes being constructed so that the ratio of $r_1-r_2$ to the distance between points A and E is within range 0.15 to 0.05.

2. The device of claim 1, wherein each of said guide vanes is constructed such that the ratio of the distance between points C and D and the distance between points A and E is within the range 0.86 to 1.0.

3. A radial flow turbo machine operable as a reversible pump-turbine, comprising: a plurality of guide vanes pivotally mounted about a runner on generally parallel axes O arranged in a generally closed path for movement between a mutually serially engaging closed position and an open position out of contact with each other; each of said guide vanes having a head portion and a tail portion joining a radially outer face and a radially inner face with respect to said closed path; each of said guide vanes having a point A, a point on its radially inner face adjacent its head portion in contact with the radially outer face of the tail portion of an adjacent second guide vane in said closed path in the closed position; each of said guide vanes having a point B, a point on its radially outer face adjacent its tail portion in contact with the point A of an adjacent guide vane in said closed position; each of said guide vanes having a point C on its radially inner surface such that a perpendicular bisector of a line between the points B and C. passes through its pivotal center O; each of said guide vanes having a point D on its inner face such that the angle ODC is 90°; each of said guide vanes having a point E on its inner face such that the angle OEA is 90°; each of said guide vanes having a radius $r_1$ from its pivotal center O to the arc tangent to its head portion and a radius $r_2$ from its pivotal center O to the arc tangent to the tail portion of the guide vane immediately adjacent to its head portion; wherein each of said guide vanes is constructed such that the ratio of the distance between points C and D and the distance between points A and E is within the range 0.86 to 1.0.

References Cited

UNITED STATES PATENTS

| 1,688,736 | 10/1928 | Moody | 253—122 |
| 1,750,400 | 3/1930 | Gibbs et al. | 253—122 |
| 2,291,110 | 7/1942 | Sharp | 253—122 |
| 3,007,675 | 11/1961 | Suss | 253—122 |

FOREIGN PATENTS

| 1,268,985 | 6/1961 | France. |
| 1,292,342 | 3/1962 | France. |
| 633,183 | 2/1962 | Italy. |

HENRY F. RADUAZO, *Primary Examiner.*